United States Patent
Pechlivanoglou et al.

(10) Patent No.: US 8,334,608 B2
(45) Date of Patent: Dec. 18, 2012

(54) LOCKING MECHANISM FOR A WIND TURBINE

(75) Inventors: Georgios Pechlivanoglou, Berlin (DE); Jürgen Wagner, Berlin (DE)

(73) Assignee: Suzlon Energy GmbH, Rostock (DE)

( * ) Notice: Subject to any disclaimer, the term of this patent is extended or adjusted under 35 U.S.C. 154(b) by 345 days.

(21) Appl. No.: 12/665,234

(22) PCT Filed: Jun. 11, 2008

(86) PCT No.: PCT/EP2008/004664
§ 371 (c)(1),
(2), (4) Date: Dec. 17, 2009

(87) PCT Pub. No.: WO2008/155053
PCT Pub. Date: Dec. 24, 2008

(65) Prior Publication Data
US 2010/0194114 A1    Aug. 5, 2010

(30) Foreign Application Priority Data

Jun. 18, 2007 (EP) ..................................... 07090122
Dec. 5, 2007 (DE) .......................... 10 2007 058 746

(51) Int. Cl.
*F03D 9/00* (2006.01)
*H02P 9/04* (2006.01)

(52) U.S. Cl. ........................................... 290/44; 290/55
(58) Field of Classification Search .................... 290/44, 290/55, 54
See application file for complete search history.

(56) References Cited

U.S. PATENT DOCUMENTS

| | | | |
|---|---|---|---|
| 5,418,442 A | 5/1995 | Araki | |
| 7,397,145 B2 * | 7/2008 | Struve et al. | 290/55 |
| 7,786,608 B2 * | 8/2010 | Menke | 290/44 |
| 7,948,100 B2 * | 5/2011 | Nies et al. | 290/44 |
| 2008/0150292 A1 * | 6/2008 | Fedor et al. | 290/55 |
| 2011/0133453 A1 * | 6/2011 | Merswolke et al. | 290/44 |

FOREIGN PATENT DOCUMENTS

| | | |
|---|---|---|
| DE | 10031472 C1 | 4/2002 |
| DE | 102004013624 A1 | 10/2005 |
| EP | 1286049 A2 | 2/2003 |
| EP | 1291521 A1 | 3/2003 |
| WO | 2008/059088 A1 | 5/2008 |

OTHER PUBLICATIONS

Bossanyi E A: "Wind Turbine Control for Load Reduction", Wind Energy, Wiley, Chichester, GB, Bd. 6, Jan. 1, 2003, pp. 229-244 (Document to Be Provided Upon Receipt of Same).
Hau E ED: "Windrkraftanlagen" Windrkraftanlagen, Grundlagen, Technik, Einsatz, Wirtschaftlichkeit, Berlin: Springer, DE, Jan. 1, 1996, pp. 318-321 (Document to Be Provided Upon Receipt of Same).

* cited by examiner

*Primary Examiner* — Hae Moon Hyeon
(74) *Attorney, Agent, or Firm* — Norris McLaughlin & Marcus, P.A.

(57) ABSTRACT

A locking mechanism for a wind turbine decelerates and/or locks a rotor or a rotor shaft of the wind turbine. For maintenance work, the rotor or the rotor shaft is lockable to a machine support of the wind turbine in a form-fit manner by utilizing the locking mechanism. A rotational position of the rotor shaft is automatically detected in a DESIRED position. Moreover, the locking mechanism is configured to be automatically engaged when the DESIRED position has been reached. The locking mechanism additionally has at least one deceleration device for affecting the drive train and/or allowing the rotational speed of the rotor and the rotor shaft to be reduced.

14 Claims, 3 Drawing Sheets

LOCKING MECHANISM FOR A WIND TURBINE

This application is a 371 application of PCT/EP2008/004664 filed Jun. 11, 2008, which claims priority to the European application 07090122.8 filed Jun. 18, 2007 and German Application 102007058746.7 filed Dec. 5, 2007.

BACKGROUND OF THE INVENTION (1) Field of the Invention

The invention relates to a locking mechanism for a wind turbine, in which a rotor shaft of a drive train is rotatably mounted on a machine support of the wind turbine while the rotor shaft can be connected to a rotor. In order to be able to do maintenance work on the wind turbine, the locking mechanism comprises locking means, especially with a movable locking bolt, which makes it possible to establish a rotationally fixed positive connection between the rotor or the rotor shaft and the machine support. In order do so, a rotational position of the rotor shaft can automatically be detected in a DESIRED position, and, furthermore, the locking means can be automatically engaged when said DESIRED position has been reached. The disclosed mechanism additionally comprises at least one deceleration device for affecting the drive train, thus allowing the rotational speed of the rotor and the rotor shaft to be reduced. Suchlike locking mechanisms are necessary because during maintenance work the rotor and the drive train of the wind turbine must be locked in a form-fit manner due to safety reasons. In order to do so, in the majority of cases, a locking bolt being movably mounted on the machine support is inserted into an opening of a locking disk which is connected to the rotor shaft in a rotatably fixed manner. In doing so, the rotor and the rotor shaft are connected in a rotatably fixed manner to the machine support of the wind turbine.

(2) Description of Related Art

DE 10 2004 013 624 A1 discloses suchlike device whereas a locking bolt can be inserted into openings of a locking disk. This is accomplished automatically when the rotor and a locking disk which is connected to the rotor are in a DESIRED position, so that the locking bolt and the openings of the locking disk are aligned with each other. Here the essential problem is that a stopping of the rotor in a defined and locally determined DESIRED position can hardly be achieved by the teaching of the invention and the features disclosed in said document.

BRIEF SUMMARY OF THE INVENTION

One aim of the invention is to design an improved locking mechanism which, among other things, overcomes the drawbacks of the prior art. In particular a device will be disclosed which enables the usage and the consideration of different influencing factors. Furthermore, another aim of the invention is to provide a method for operating a locking mechanism, in particular for a defined safe and exact stopping of a rotor shaft in a DESIRED position.

According to the invention, said aim is achieved by means of the features of main claim 1, whereas sensor means are provided for detecting a rotational speed of the rotor shaft. The mechanism according to the invention makes it possible for the first time to estimate or calculate the required braking force and/or the breaking distance of the deceleration device by comparing the current position of the rotor shaft with the DESIRED position once the rotational speed is known, thus allowing the rotor shaft to be safely, gently and accurately decelerated to a standstill in the DESIRED position. Furthermore, in this estimation also the mass inertia of the rotor or rather of the entire rotating power train can be used since the decelerating energy which needs to be applied mainly equals the entire rotating energy of the power train and the rotor less the friction losses.

According to a useful embodiment of the invention sensor means are provided for detecting a rotational direction. Thus, also a deceleration of the rotor can be achieved if the rotor and the power train are rotated in an opposite direction with respect to the main rotating direction of the wind turbine.

Advantageously the sensor means for detecting the position, the rotational speed and the rotational direction can be designed in the form of a multitude of rotor position sensors, preferably in particular with the help of two rotor position sensors. Here, the rotor position sensors have to be arranged at different positions on the circumference of the rotor shaft or the locking disk. Additional sensor means for detecting the position of the locking bolt or of the locking means can be provided.

According to one embodiment of the invention one deceleration device is designed as friction deceleration device and sensor means are provided in an electronic brake for detecting the status, which means among others the actuation force, the actuation distance, the temperature and/or the actuation current. In particular the drive train can comprise a gearing with a fast output shaft and a braking disk, whereas the fast output shaft can be engaged by a deceleration device. Thus the required braking moment and therefore also the actuation force of the deceleration device is reduced significantly.

In order to enhance the performance of the locking mechanism further sensor means for detecting the position and/or the rotational speed of the fast output shaft or the braking disk are provided. Thus, strains and vibrations of the power train caused by torsion can be included in the estimation of the deceleration process. Furthermore, as an additional effect, the performance of the gearing can be controlled.

If sensor means for detecting a wind speed, for example an anemometer, are provided, the performance of the system of the locking mechanism is optimized.

Using this data the required braking power of the deceleration device can be estimated since the rotor is accelerated or decelerated aerodynamically by the wind according to the angle of attack of the rotor blades. By doing so—as an additional option—the angle of attack of at least one rotor blade of the rotor can be adjusted in such a manner that an aerodynamical deceleration device or an aerodynamical propulsion is provided. Thus, a decelerating or a positive accelerating moment affecting the drive train can be generated, providing sensor means for detecting the angle of attack.

According a preferred embodiment oft the invention a controller is provided which at least is connected to the sensor means detecting the position, the rotational direction, the rotational speed of the rotor shaft and optional the status of the decelerating device. According to the invention, this controller collects the data of the sensor means and executes the estimation or calculation of the deceleration of the drive train. The controller is connected to an aerodynamical deceleration or acceleration device—that means to at least one pitch drive of a rotor blade—and/or connected to a deceleration device based on friction and can control one or both deceleration devices in order execute the deceleration of the rotor until the standstill in the defined DESIRED position. For this, it is beneficial if the controller is additionally connected to at least one of the following sensor means: Sensor means for detecting the position of the locking means, respectively the locking bolt, sensor means for detecting the status of the friction deceleration device, sensor means for detecting the position and/or the rotational speed of the fast output shaft or of the braking disk, sensor means for detecting a wind speed and sensor means for detecting the angle of attack of at least one rotor blade.

Within the scope of the present invention, furthermore, a wind turbine is disclosed which comprises a machine house which is rotatably mounted on a tower, and which additionally comprise a machine support and a locking mechanism according to the previously mentioned embodiments, whereas its features are completely or partly implemented.

Within the context of the present invention a method for operating a locking mechanism for a wind turbine is disclosed. This method comprises the steps: Detecting the position, the rotational direction and the rotational speed of a rotor shaft of the wind turbine, comparing the current position of the rotor shaft to a DESIRED position of the rotor shaft, and controlling at least one deceleration device in order to decelerate the rotor shaft until the standstill in the DESIRED position. In doing so, the status of the deceleration device can additionally be detected. In detail, a difference between the current and the DESIRED position of the rotor shaft is detected, whereas a braking force or rather an actuation force of the decelerating device is determined and adjusted in concordance with the present rotational speed of the drive train, the actual wind speed and the mass inertia of the rotating parts, in order to stop the rotor shaft in the exact DESIRED position. Additionally and at the same time, the aerodynamic deceleration device for supporting the friction deceleration device can be activated by adjusting an angle of attack of at least one rotor blade after detecting the wind speed so that this rotor blade generates a moment which decelerates the rotating axis.

This way and by accelerating the rotor with the help of one or more of the rotor blades, the rotor of a wind turbine which is coasting freely can be locked in order to stop the rotor in the DESIRED position with the help of one of the methods mentioned above. In this context it is possible to couple an additional rotation into the power train, for example with the help of a hand wheel, an electronic motor or with the help of other means of propulsion.

Within the scope of the method according to the invention it can be reasonable to decelerate the rotor shaft or a fast output shaft at least one time automatically until stand-still before reaching the DESIRED position of the rotor shaft. In particular the desired position is to be reached at least partly with the help of alternating start and stop movements of the rotor shaft or the fast output shaft. In doing so the rotor and the rotor shaft slowly approach the desired position in small and controlled steps.

After the rotor and the rotor shaft have been brought into the DESIRED position with the help of the friction deceleration device and/or the aerodynamic brake and when the DESIRED position of the rotor shaft (5) is detected by a controller (100), the locking means, for example a locking bolt, are engaged in such a manner that the rotor shaft is connected to the machine support in a rotatably fixed manner via a positive connection.

The given steps of the method are not to be interpreted as limiting. In fact further reasonable method steps can broaden and improve the method according to the invention.

Further details of the invention are disclosed in the description of the drawings.

DETAILED DESCRIPTION OF THE INVENTION

Figure 1:
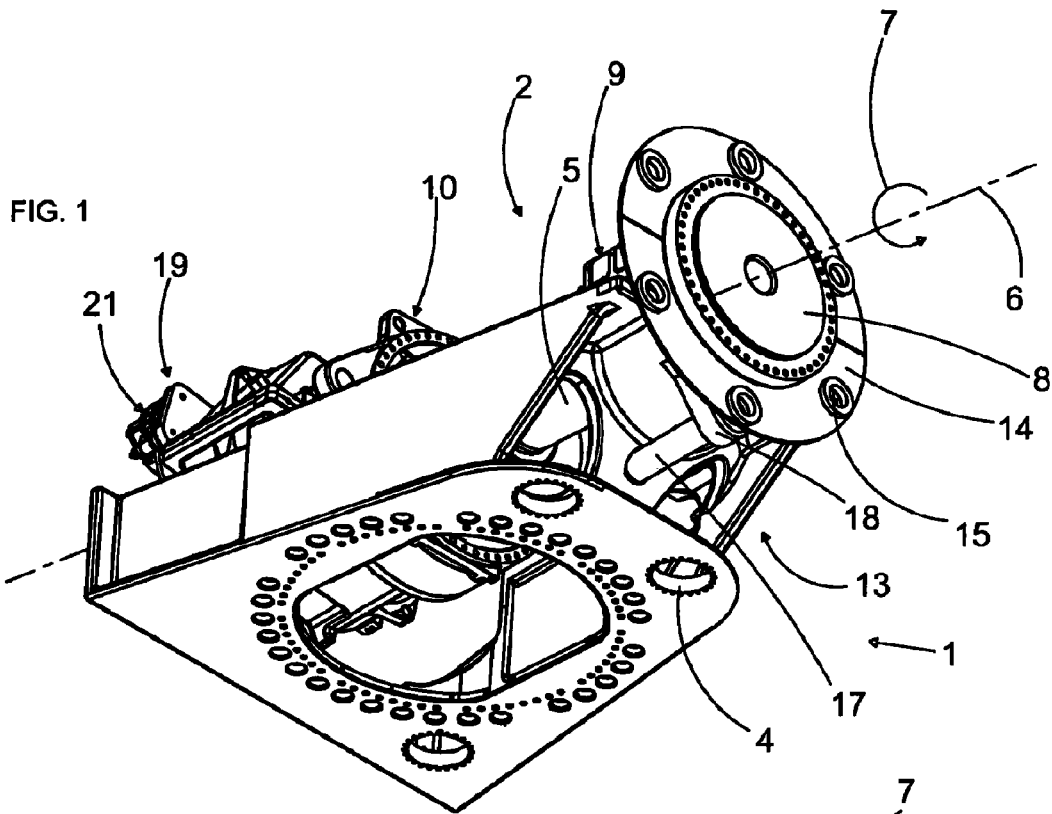
FIG. 1 shows a perspective view of a bottom side of a first embodiment of a machine support of a wind turbine.
Figure 2:
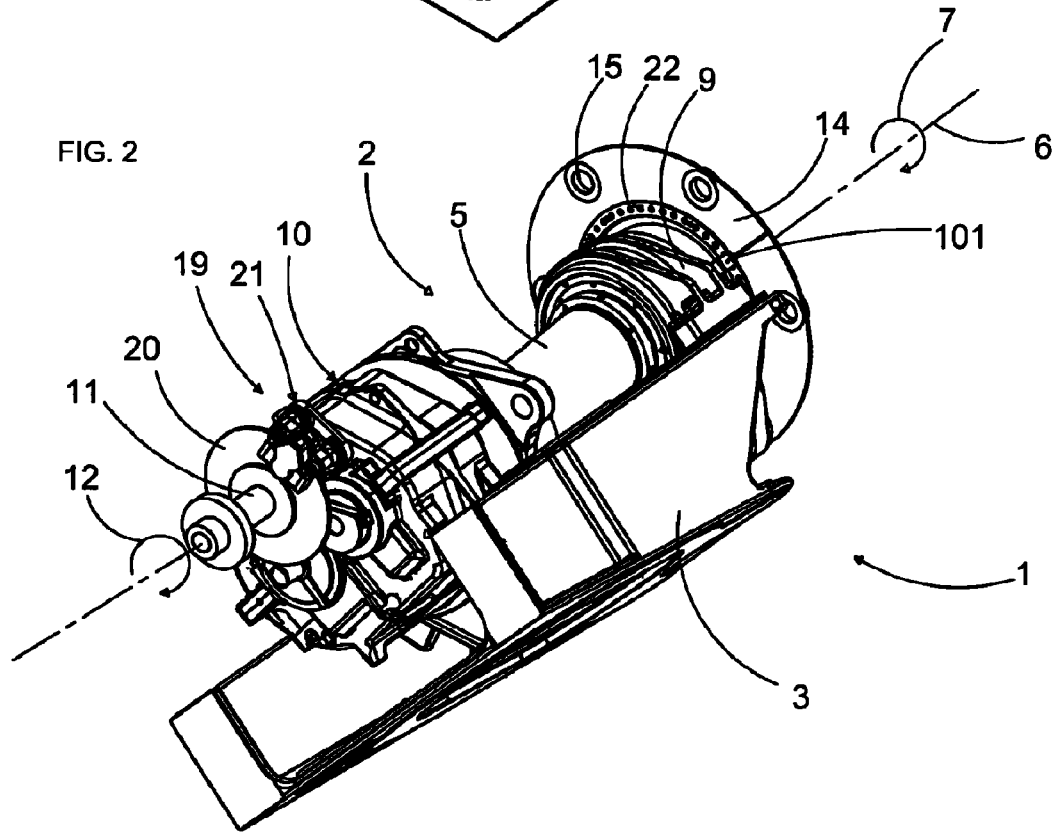
FIG. 2 shows a further view of the machine support according to FIG. 1.
Figure 3:
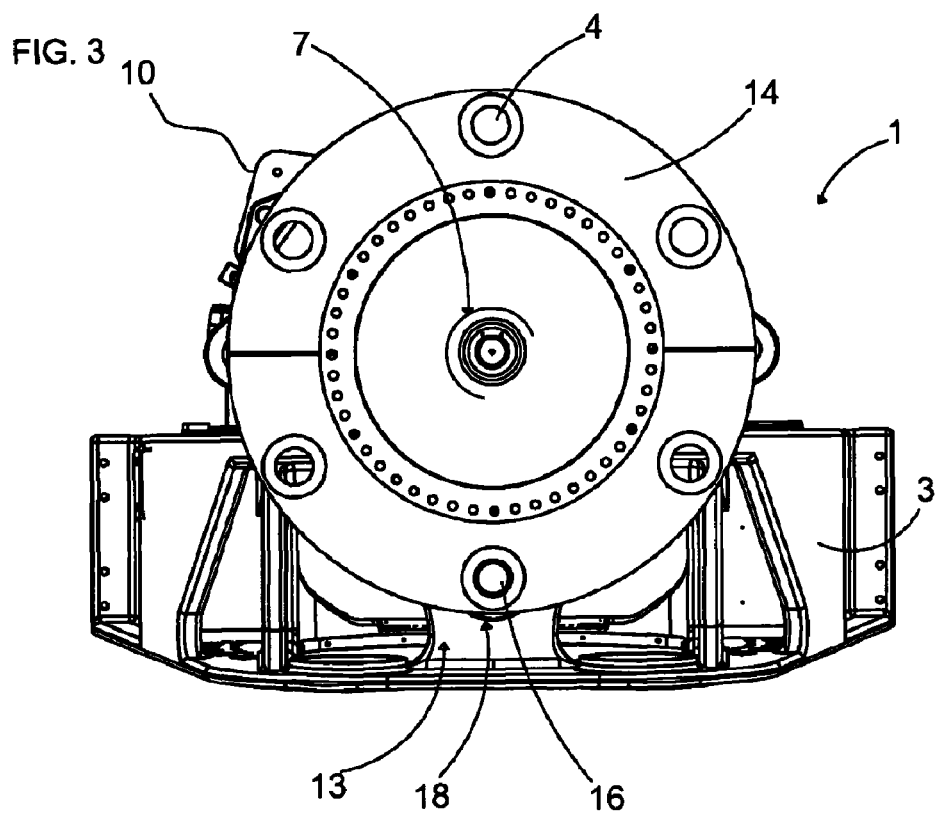
FIG. 3 shows a frontal view of the machine support according to FIG. 1.
Figure 4:
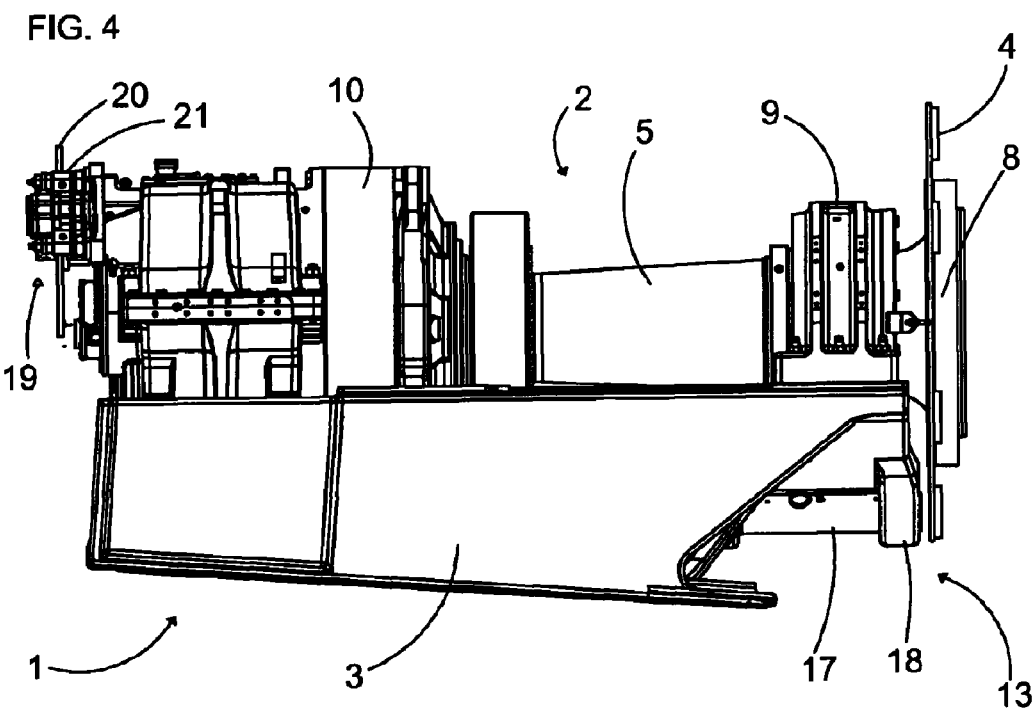
FIG. 4 shows a side view of the machine support according to FIG. 1.

FIGS. 1 to 4 show different views of one embodiment of the invention. The locking mechanism 1 functions between a drive train 2 and a machine support 3 of the wind turbine which is not completely shown in these drawings. A machine house comprises the machine support 3 and is rotatably mounted on the tower which is not shown in the drawings via an azimuth bearing which is not shown in the drawings. Openings 4 in the machine support 3 are adapted to receive azimuth drives which in co-operation with a rotatably fixed tooth rim of the azimuth bearing represent the yaw control of the machine house.

In the figures the essential elements of the drive train 2 are shown, whereas a rotor shaft 5 is rotatably mounted about a rotational axis 6 on the machine support 3 via a rotor bearing 9 and via a gearing 10. In the following the rotational axis 6 of the rotor of the wind turbine will be used as a reference system in terms of geometrical specifications. The gearing 10 is used to transform the incoming rotation 7 of the rotor shaft 5 which comprises a low rotation speed and a high moment to an outgoing rotation 12 with a low moment and a greater rotation speed. This outgoing rotation 12 can be transferred via a fast output shaft 11 to a generator not shown in the drawings for the purpose of electricity production. Thus the gearing 10 functions as torque support for the rotor shaft 5, whereas the housing of the gearing 10 is supported by the machine support 3 via bearing blocks which are not shown in the drawings.

A shaft flange 8 is provided on the rotor shaft 5 on which the rotor hub of the rotor which is not shown in the drawings is connectable with the help of a multitude of screws. Next to the shaft flange 8 a locking disk 14 of the locking means 13 is arranged which is connected to the rotor shaft 5 in a rotatably fixed manner. The locking disk 14 comprises a multitude of axially aligned openings 15 and is—for the purpose of an easy replacement—designed in two parts. Besides the locking disk 14 with the openings 15, the locking means 13 comprise a locking bolt 16 which is mounted in an axial slidable manner in a bolt guiding 17 on the machine support 3. In a locked state to some extend considerable forces are transferred to the machine support 3 via the locking bolt 16 and via the bolt guiding 17, for example caused by gusts of wind. Therefore a reinforcement 18 is provided on the machine support 3 in the area of the bolt guiding 17. The locking bolt 16 is preferably actuated electromechanically. The advantage of this compared to a hydraulic actuation is, that no leaking of the actuation fluid—for example oil—can enter into the machine house by accident.

The fast output shaft 11 of the gearing 10 can be engaged by a friction deceleration device 19. This friction deceleration device 19 comprises a brake calliper 21 which axially encompasses a braking disk 20. This brake calliper 21 is electromechanically tensionable—with the help of an electric motor—the actuation force being adjustable. By detecting the current of the electric motor a conclusion about the actuation force can be drawn as current and torque of the motor in a known proportion to each other. Other measuring methods and measuring elements for the actuation force can also be used.

According to the embodiment shown in the FIGS. 1 to 4 a sensor means 101 which is designed as an integrated speed sensor is provided next to the rotor bearing 9. This sensor can detect the position, the rotational direction and the speed of the rotor shaft 5 with the help of signals being proportional to the rotation that are generated by sensor elements 22 which are connected to the rotor shaft in a rotationally fixed manner. Some geometrical or magnetic variations could be allocated circumferentially in the shaft flange 8 or in the locking disk 14. For this sensor means 101 can be designed as a magnetic sensor which detects a rotationally proportional fluctuation of a magnetic field and which outputs a voltage proportional to the fluctuation of the magnetic field.

Figure 5:
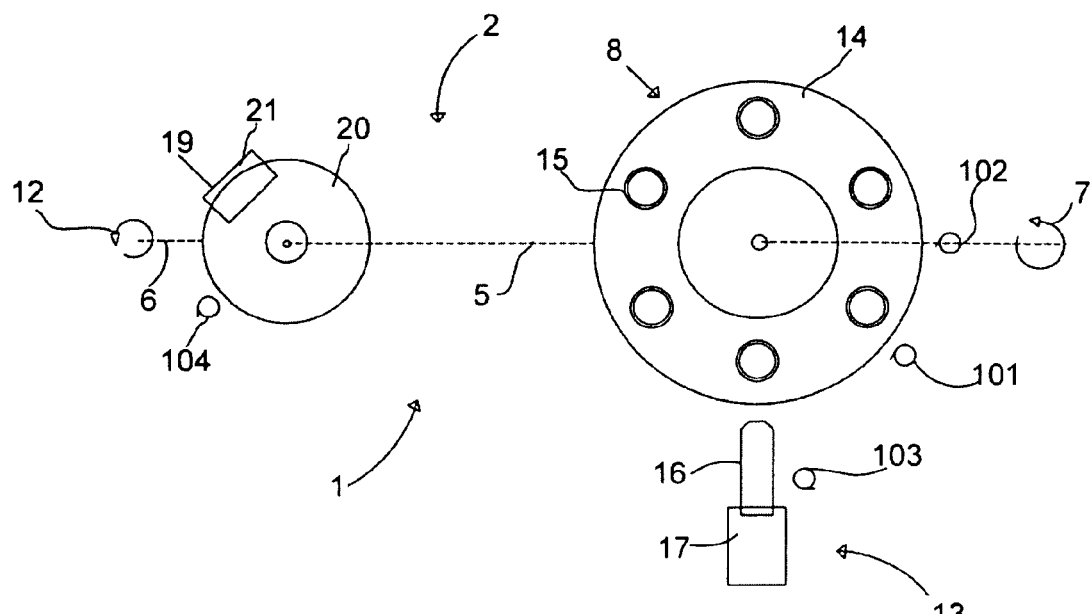
FIG. 5 shows a schematic view of the locking mechanism according to FIG. 1.

In FIG. 5 a slightly varied embodiment is shown, whereas the sensor means 101 and 102 for measuring the rotational speed are designed as co-operating sensors placed at two positions with a fixed angular distance to one another. Furthermore the functioning of the locking mechanism 1 is outlined with the help of the schematic view of FIG. 5 with the block diagram of FIG. 6. The sensor means 101 and 102 enable the detection of the rotational direction the position and the rotational speed of the rotor shaft 5 and the sensor means 103 provide the current position and state of the locking means 13. The rotational speed of the fast output shaft 11 or the braking disk 20 is detected with the help of the sensor means 104, designed as a speed sensor. The braking disk 20 and the locking disk 14 are interdigitated geometrically via the drive train 2 which is represented by a dashed line. Thus the rotational speed of the rotor shaft 5 can also be determined with the help of sensor means 104 at the friction deceleration device 19. The measuring of speed and position at the fast output shaft enables a higher resolution of the measured data respectively.

Figure 6:
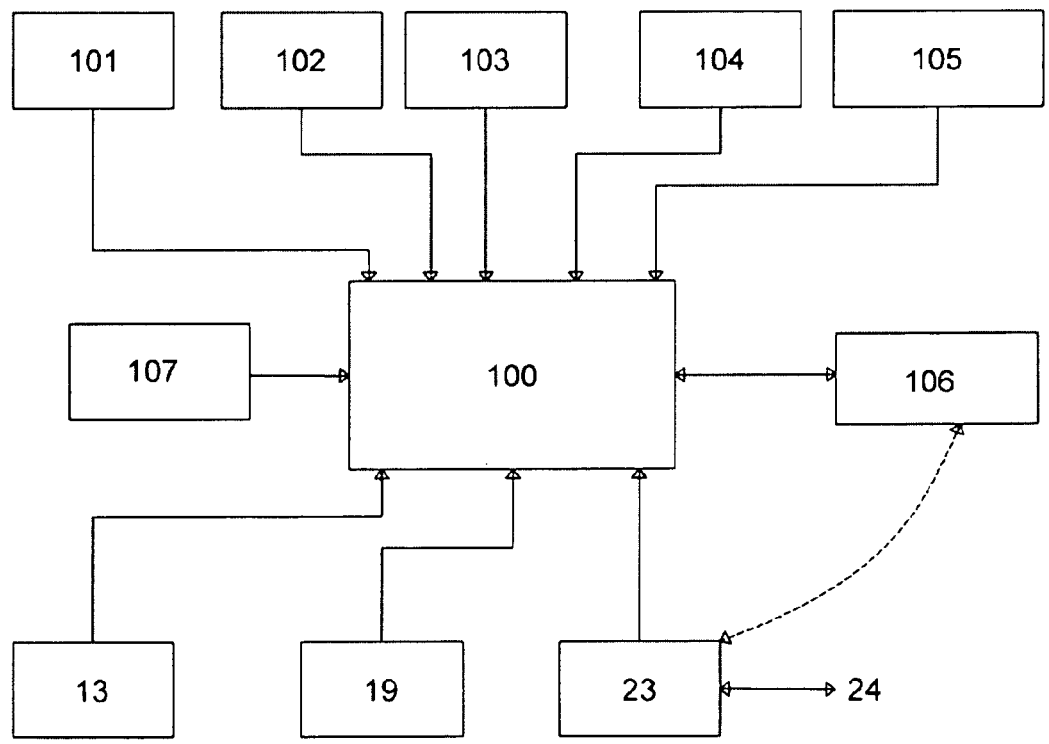
FIG. 6 shows a block diagram of the assembly of the sensor means, the controller and the actuating elements.

In FIG. 6 sensor means 105 are shown by a block that represents an anemometer 105 which is installed on the machine house. The wind speed, that charges the rotor of the wind turbine, is a significant factor in order to decelerate and lock the rotor in a controlled way. That is why the wind speed mainly influences the functioning of an aerodynamic acceleration and deceleration device 24, if the rotor blades are inclined in a decelerating manner with respect to the wind the aerodynamic acceleration and deceleration device 24 will work as a deceleration device. In doing so, the angle of attack 23 of the rotor blades are adjusted with the help of a pitch drive so that a rotor moment is generated which works against the present rotation 7. Furthermore the controller 100 is connected to the sensor means 106 which are designed as angle sensing elements in order to know the angle of attack 23.

The sensor signals of the different sensor means 101, 102, 103, 104, 105 and 106 are brought together in the controller 100. Using said signals, the controller 100 controls the respective components especially the aerodynamic decelerating or accelerating device 24 and the friction deceleration device 19 in order to bring the rotor shaft into a locking position and to stop it there. As soon as the rotor shaft is in the DESIRED position, the controller 100 controls the locking of the wind turbine with the help of the locking means 13.

In detail the procedure of locking of the wind turbine can be described as follows:

If the locking of the rotor is induced by an operator or by another initializing process, then the controller 100 will collect and evaluate the signals of the sensor means 101, 102, 103, 104, 105 and 106. On the basis of the present position, rotational direction and rotational speed of the rotor and the rotor shaft 5, and on the basis of the angle of attack 23 of the rotor blades and of the wind speed, the controller 100 calculates an acceleration and deceleration strategy for decelerating the rotor into the DESIRED position. If the wind turbine is coasting freely due to low wind speed, then at first the rotor and the rotor shaft 5 are brought into rotation with the help of a favourable angle of attack 23 of the rotor blades. After a DESIRED and ACTUAL comparing of position of the rotor shaft 5 has been conducted, the friction deceleration device 19 and the aerodynamic deceleration device 24 can be activated by the controller 100. With the help of iterative observation of the position of the rotor and by controlling the deceleration devices 19, 24—possibly also by an estimating the decelerating process—the rotor shaft is stopped in a DESIRED position. In doing so, also the actuation force of the friction deceleration device 19 is controlled and adjusted respectively. The friction deceleration device 19, which can be actuated electromechanically, can be controlled in such a fast and precise manner that, under certain circumstances, a continuous rotation 7 or 12 of the rotor shaft 5 or the output shaft 11 devolves to very precise slip-stick rotation shortly before reaching the DESIRED position of the rotor shaft 5. In the process, the controller 100 and the drive train 2 approach the DESIRED position incrementally in order to decelerate completely and permanently once the DESIRED position is reached. This alternating start and stop movement of the rotor shaft 5 and/or the braking disk 20 or rather the output shaft 11 make it possible for the first time to precisely approach the DESIRED position. Furthermore, by doing so, the elasticity of the drive train 2 or rather the gearing 10 can be used, so that the rotor and the rotor shaft 5 continuously approach the DESIRED position, whereas the output shaft 11, however, executes an alternating start and stop movement.

If the opening 15 of the locking disk 14 is aligned with the locking bolt 16, and if the rotor shaft 5 is in the DESIRED position, the controller 100 starts the actual locking process by activating the locking means 13. In particular, the locking bolt 16 is moved out of the bolt guiding 17 and is inserted into the opening 15 of the locking disk 14, the first being aligned with the bolt guiding 17. With the help of the sensor means 103, the position of the locking means 13 is checked and if the locking mechanism 1 effectively blocks and locks the rotor 5, then the controller 100 transmits a respective signal to the interface 107. This interface 107 can directly address an operator, for example via light or sound signal, or transmit a signal to another controller.

The combination of features disclosed in the embodiments described above, are not to be interpreted as limiting with respect to the invention, in fact, also the features of the different embodiments are combinable with each other.

| List of reference numerals: | |
|---|---|
| 1 | locking mechanism |
| 2 | drive train |
| 3 | machine support |
| 4 | openings |
| 5 | rotor shaft |
| 6 | rotational axis |
| 7 | rotation |
| 8 | shaft flange |
| 9 | rotor bearing |
| 10 | gearing |
| 11 | output shaft |
| 12 | rotation |
| 13 | locking means |
| 14 | locking disk |
| 15 | openings |
| 16 | locking bolt |
| 17 | bolt guiding |
| 18 | reinforcement |

-continued

List of reference numerals:

| | |
|---|---|
| 19 | deceleration device |
| 20 | braking disk |
| 21 | brake calliper |
| 22 | sensor elements |
| 23 | angle of attack |
| 24 | deceleration device or acceleration device |
| 100 | controller |
| 101 | sensor means |
| 102 | sensor means |
| 103 | sensor means |
| 104 | sensor means |
| 105 | sensor means |
| 106 | sensor means |
| 107 | interface |

The invention claimed is:

1. A locking mechanism for a wind turbine, wherein the wind turbine has a rotor shaft of a drive train rotatably mounted on a main frame of the wind turbine, wherein the rotor shaft is connectable to a rotor, the locking mechanism comprising:

locking means configured to create a torque-proof connection between the rotor shaft and the main frame through form-locking,
wherein the locking means is configured to be automatically engaged when reaching a target position;
at least one braking device for supplying a braking torque to the drive train;
a control unit; and
first sensor means,
wherein:
the control unit is connected to the first sensor means, wherein the first sensor means is configured to detect at least a position of the rotor shaft, a rotational direction of the rotor shaft, a rotational speed of the rotor shaft and a status of the at least one braking device,
and further wherein the at least one braking device is configured to be controlled by the control unit using sensor data from the first sensor means such that the rotor shaft is decelerated and brought to a complete stop in the target position.

2. The locking mechanism according to claim 1, wherein the first sensor means comprises a multitude of rotor position sensors.

3. The locking mechanism according to claim 1, further comprising:
second sensor means configured to detect a position of a sliding locking pin of the locking means.

4. The locking mechanism according to claim 1, further comprising:
second sensor means configured to detect a status of a friction brake device of the braking device.

5. The locking mechanism according to claim 4, wherein the drive train comprises a gear box with a fast output shaft and a brake disk, configured to act upon by the braking device.

6. The locking mechanism according to claim 5, further comprising:
third sensor means configured to detect a position or a rotational speed of the fast output shaft or the brake disc.

7. The locking mechanism according to claim 1, further comprising:
second sensor means configured to detect a wind speed.

8. The locking mechanism according to claim 1, further comprising:
second sensor means configured to detect an angle of attack of at least one rotor blade, wherein the angle of attack is variable.

9. The locking mechanism according to claim 1, wherein the first sensor means comprises two rotor position sensors.

10. A method for decelerating a wind turbine, the wind turbine has a rotor shaft of a drive train rotatably mounted on a main frame of the wind turbine, wherein the rotor shaft is connectable to a rotor, the method comprising:

providing a locking mechanism having (i) locking means configured to create a torque-proof connection between the rotor shaft and the main frame through form-locking, wherein the locking means is configured to be automatically engaged when reaching a target position, (ii) at least one braking device for supplying a braking torque to the drive train, (iii) a control unit and (iv) first sensor means, wherein the control unit is connected to the first sensor means, and the at least one braking device is configured to be controlled by the control unit using sensor data from the first sensor means;
detecting, via the first sensor means, a position, a rotational direction and a rotational speed of a rotor shaft of the wind turbine;
comparing the position of the rotor shaft with a target position of the rotor shaft;
calculating necessary braking power based on the detected position, the rotational speed and the rotational direction of the rotor shaft;
controlling the at least one braking device, to decelerate the rotor shaft or bring the rotor shaft to a complete stop at the target position; and
detecting, via the first sensor means, the status of the braking device.

11. The method according to claim 10, further comprising:
detecting a wind speed, and
adjusting an angle of attack of at least one rotor blade, so that a decelerating or accelerating torque acting on the drive train is created.

12. The method according to claim 10, wherein the locking means, comprising a locking pin, are brought into engagement in such a manner that the rotor shaft is torque-proof connected through form-locking to the main frame when the target position of the rotor shaft is detected by the control unit.

13. The method according to claim 10, wherein the rotor shaft or a fast output shaft is decelerated and brought to a complete stop before the rotor shaft reaches the target position.

14. The method according to claim 13, wherein the target position is reached at least partly by alternating start and stop movements of the rotor shaft or the fast output shaft.

* * * * *